US008402053B2

(12) United States Patent
Roediger et al.

(10) Patent No.: US 8,402,053 B2
(45) Date of Patent: Mar. 19, 2013

(54) REGISTERING AND DISCOVERING UNIQUE IDENTIFIERS

(75) Inventors: Karl Christian Roediger, Dielheim (DE); Gunther Stuhec, Heidelberg (DE)

(73) Assignee: SAP AG, Walldorf (DE)

( * ) Notice: Subject to any disclaimer, the term of this patent is extended or adjusted under 35 U.S.C. 154(b) by 135 days.

(21) Appl. No.: 12/979,993

(22) Filed: Dec. 28, 2010

(65) Prior Publication Data

US 2012/0166392 A1 Jun. 28, 2012

(51) Int. Cl.
    *G06F 17/30* (2006.01)
(52) U.S. Cl. .................... 707/770; 707/636; 707/775
(58) Field of Classification Search .............. 707/636, 707/770, 775
    See application file for complete search history.

(56) References Cited

U.S. PATENT DOCUMENTS

| 2006/0195563 | A1* | 8/2006 | Chapin et al. ............. 709/223 |
| 2010/0082447 | A1* | 4/2010 | Lin et al. .................... 705/26 |
| 2010/0141779 | A1* | 6/2010 | Rhoads ................... 348/207.1 |
| 2010/0282836 | A1* | 11/2010 | Kempf et al. .............. 235/375 |
| 2011/0060667 | A1* | 3/2011 | Kraft ......................... 705/27.2 |

OTHER PUBLICATIONS

Business Transformation Agency. "Standard Financial Information Structure (SFIS) Resources: The Common Business Language of DoD." [Retrieved on Dec. 28, 2010]. Retrieved from the Internet <URL: http://www.bta.mil/SFIS/sfis_resources.html> (4 pages).

ClueBot. "IP address." Oct. 29, 2010; Wikipedia [Retrieved on Dec. 28, 2010]. Retrieved from the Internet <URL: http://en.wikipedia.org/w/index.php?title=IP_address&oldid=393573876> (9 pages).
Corz.org. "Static IP Address." [Retrieved on Dec. 28, 2010]. Retrieved from the Internet <URL: http://corz.org/comms/hardware/router/static.ip.address.php> (16 pages).
Department of Defense. "Department of Defense Guide to Uniquely Identifying Items: Assuring Valuation, Accountability and Control of Government Property." Version 1.6, Jun. 1, 2006; Office of Deputy Under Secretary of Defense (Acquisition, Technology & Logistics) (72 pages).
DOI.ORG. "Frequently Asked Questions about the DOI System." Oct. 18, 2010, DOI.ORG [Retrieved on Dec. 28, 2010]. Retrieved from the Internet <URL: http://www.doi.org/faq.html> (12 pages).
DPAP: Department Procurement and Acquisition Policy. "Accounting and Valuation." [Retrieved on Dec. 28, 2010]. Retrieved from the Internet <URL:http://www.acq.osd.mil/dpap/pdi/uid/accounting_and_valuation.html> (2 pages).

(Continued)

*Primary Examiner* — Khanh Pham
(74) *Attorney, Agent, or Firm* — Fish & Richardson P.C.

(57) ABSTRACT

In general, the subject matter described in this specification can be embodied in methods, systems, and program products for discovering information that is related to a unique object identifier from a decentralized collection of computing systems. A unique object identifier is identified. A first information request that includes the unique object identifier is forwarded to a first computing system. First information that the first computing system has stored in association with the unique object identifier is received from the first computing system. An identifier for a second computing system is received from the first computing system in response to the first information request. A second information request that includes the unique object identifier is forwarded to the second computing system based on the received identifier. Second information that the second computing system has stored in association with the unique object identifier is received from the second computing system.

18 Claims, 9 Drawing Sheets

OTHER PUBLICATIONS

DPAP: Department Procurement and Acquisition Policy. "Unique Identification: UID Forum." [Retrieved on Dec. 28, 2010]. Retrieved from the Internet <URL:http://www.acq.osd.mil/dpap/pdi/uid/> (2 pages).

DPAP: Department Procurement and Acquisition Policy. "Technology." [Retrieved on Dec. 28, 2010]. Retrieved from the Internet <URL: http://www.acq.osd.mil/dpap/pdi/uid/technology.html> (3 pages).

Greenwood, Darrell. "MAC address." Oct. 30, 2010; Wikipedia [Retrieved on Dec. 28, 2010]. Retrieved from the Internet <URL: http://en.wikipedia.org/w/index.php?title=MAC_address&oldid=393881406> (5 pages).

GS1 EPCglobal. "EPC Information Services (EPCIS) Version 1.0.1 Specification." Sep. 21, 2007; EPCglobal (146 pages).

GS1 EPCglobal. "EPC Tag Data Standard Version 1.5." Aug. 18, 2010; EPCglobal (210 pages).

GS1 EPCglobal. "EPCglobal Tag Data Standards Version 1.4." Jun. 11, 2008; EPCglobal (120 pages).

Handle System. "General FAQs." Dec. 2010 [Retrieved on Dec. 28, 2010]. Retrieved from the Internet <URL: http://www.handle.net/faq.html> (1 page).

How Stuff Works. "What is an IP address?" 1998-2010; HowStuffWorks, Inc. [Retrieved on Dec. 28, 2010]. Retrieved from the Internet <URL: http://computer.howstuffworks.com/internet/basics/question549.htm> (3 pages).

John of Reading. "QR Code." Nov. 1, 2010; Wikipedia [Retrieved on Nov. 1, 2010]. Retrieved from the Internet <URL: http://en.wikipedia.org/w/index.php?title=QR_Code&oldid=394249217> (6 pages).

Johnuniq. "Uniform Resource Locator." Oct. 31, 2010; Wikipedia [Retrieved on Nov. 1, 2010]. Retrieved from the Internet <URL: http://en.wikipedia.org/w/index.php?title=Uniform_Resource_Locator&oldid=393917544> (4 pages).

Langille, Dan. "Avoiding dynamic IP address woes with VPN." Nov. 26, 2008; Dan Langille: The Other Diary [Retrieved on Dec. 28, 2010]. Retrieved from the Internet <URL: http://dan.langille.org/2008/11/26/avoiding-dynamic-ip-address-woes-with-a-vpn/> (2 pages).

Liu, Xu, David Doermann, and Huiping Li. "Imaging as an Alternative Data Channel for Camera Phones."2006 ;Institute for Advanced Computer Studies and Applied Media Analysis, Inc. (6 pages).

Office of the Deputy Under Secretary of Defense. "Real Property Unique Identifier (RPUID)." [Retrieved on Dec. 28, 2010]. Retrieved from the Internet <URL: http://www.acq.osd.mil/ie/bei/rpui.shtml> (2 pages).

Onken, Bastian. "Handle System: Eine Architektur fur eindeutige Bezeichner." Jan. 31, 2008; Handle System. (23 pages).

Paskin, Norman. "The Handle System: ITU Focus Group on Identity Management." Geneva, Feb. 2007; Corporation for National Research Initiatives. (22 pages).

Phillips, Pat. "DoD Standard Financial Information Structure." DAI Industry Day, Dec. 11, 2006. (92 pages).

Port Forward. "How to set up a static IP address on a Windows XP computer." [Retrieved on Dec. 28, 2010]. Retrieved from the Internet <URL: http://portforward.com/networking/static-xp.htm> (7 pages).

SAP. "SAP Solutions for RFID." 2007; SAP AG. (20 pages).

Spec2000. "Traceability Standards: About Traceablity Standards." 2002, Air Transport Association of America, Inc. [Retrieved on Dec. 28, 2010]. Retrieved from the Internet <URL: http://www.spec2000.com/50.html> (2 pages).

T. Berners-Lee. "Uniform Resource Identifier (URI): Generic Syntax." Jan. 2005; The Internet Society [Retrieved on Dec. 28, 2010]. Retrieved from the Internet <URL: http://labs.apache.org/webarch/uri/rfc/rfc3986.html> (44 pages).

W3C. "URIs, URLs, and URNs: Clarifications and Recommendations 1.0" Sep. 21, 2001; URI Planning Interest Group, W3C/IETF [Retrieved on Nov. 1, 2010]. Retrieved from the Internet <URL: http://www.w3.org/TR/2001/NOTE-uri-clarification-20010921/> (8 pages).

XLinkBot. "Domain Name System." Oct. 31, 2010; Wikipedia [Retrieved Nov. 1, 2010]. Retrieved from the Internet <URL: http://en.wikipedia.org/w/index.php?title=Domain_Name_System&oldid=394004956> (15 pages).

\* cited by examiner

```
<?xml version="1.0" encoding="utf-8" ?>
<xs:schema elementFormDefault="qualified" xmlns:xs="http://www.w3.org/2001/XMLSchema">
    <xs:element name="RegisterUniqueInstanceObjectIdentifier" type="RegisterUniqueInstanceObjectIdentifierType" />
    <xs:element name="DiscoverSystems" type="DiscoverSystemsType" />
    <xs:complexType name="RegisterUniqueInstanceObjectIdentifierType">
        <xs:sequence>
            <xs:element minOccurs="1" maxOccurs="unbounded" name="UniqueInstanceObjectID" type="xs:string" />
            <xs:element minOccurs="0" maxOccurs="1" name="SendingSystem" type="SystemType" />
            <xs:element minOccurs="0" maxOccurs="1" name="ReceivingSystem" type="SystemType" />
        </xs:sequence>
    </xs:complexType>
    <xs:complexType name="DiscoverSystemsType">
        <xs:sequence>
            <xs:element minOccurs="1" maxOccurs="unbounded" name="UniqueInstanceObjectID" type="xs:string" />
            <xs:element name="SourceDiscoveryRequestingSystem" type="SystemType" />
            <xs:element minOccurs="0" maxOccurs="1" name="DiscoveryRequestingSystem" type="SystemType" />
            <xs:element minOccurs="0" maxOccurs="1" name="DiscoveryAddressingSystem" type="SystemType" />
        </xs:sequence>
    </xs:complexType>
    <xs:complexType name="SystemType">
        <xs:choice>
            <xs:element name="ID" type="xs:string" />
            <xs:element name="AddressURI" type="xs:anyURI" />
        </xs:choice>
    </xs:complexType>
</xs:schema>
```

FIG. 5

REGISTERING AND DISCOVERING UNIQUE IDENTIFIERS

TECHNICAL FIELD

This document generally relates to unique identifiers for information.

BACKGROUND

An instance of an object (or a resource) can uniquely be identified across multiple systems by a unique object identifier. A centralized system can store a collection of such identifiers and information that is associated with each identifier. For example, a device can query the centralized system to obtain information that is associated with a particular identifier. In response, the centralized system may return the information.

Unique object identifiers may be physically stored on products, for example, with a bar code, a data matrix, or a Radio Frequency Identification (RFID) tag. Devices may read the unique identifiers from the products, and may use the unique identifiers to obtain the information about the products from the centralized system.

SUMMARY

This document describes techniques, methods, systems, and mechanisms for registering and discovering unique identifiers.

In general, one aspect of the subject matter described in this specification can be embodied in a computer-implemented method for discovering information that is related to a unique object identifier from a decentralized collection of computing systems that have stored information in association with the unique object identifier. The method includes identifying, in a computing device, a unique object identifier. The method includes forwarding, from the computing device to a first computing system, a first information request that includes the unique object identifier. The method includes receiving, in the computing device and from the first computing system, first information that the first computing system has stored in association with the unique object identifier. The method includes receiving, in the computing device and from the first computing system in response to the first information request, an identifier for a second computing system. The method includes forwarding, from the computing device to the second computing system based on the received identifier, a second information request that includes the unique object identifier.

Another aspect of the subject matter described in this specification can be embodied in a computer program product tangibly embodied in a computer-readable storage device and comprising instructions that when executed perform a method for discovering information that is related to a unique object identifier from a decentralized collection of computing systems that have stored information in association with the unique object identifier. The method includes identifying, in a computing device, a unique object identifier. The method includes forwarding, from the computing device to a first computing system, a first information request that includes the unique object identifier. The method includes receiving, in the computing device and from the first computing system, first information that the first computing system has stored in association with the unique object identifier. The method includes receiving, in the computing device and from the first computing system in response to the first information request, an identifier for a second computing system. The method includes forwarding, from the computing device to the second computing system based on the received identifier, a second information request that includes the unique object identifier.

In yet another aspect, a system comprises a programmable processor; and a computer-readable storage device coupled to the processor and having instructions stored therein, which when executed by the processor causes the processor to perform a method for discovering information that is related to a unique object identifier from a decentralized collection of computing systems that have stored information in association with the unique object identifier. The method includes identifying, in a computing device, a unique object identifier. The method includes forwarding, from the computing device to a first computing system, a first information request that includes the unique object identifier. The method includes receiving, in the computing device and from the first computing system, first information that the first computing system has stored in association with the unique object identifier. The method includes receiving, in the computing device and from the first computing system in response to the first information request, an identifier for a second computing system. The method includes forwarding, from the computing device to the second computing system based on the received identifier, a second information request that includes the unique object identifier.

Additional aspects can optionally include one or more of the following features. The method can include receiving, in the computing device and from the second computing system, second information that the second computing system has stored in association with the unique object identifier. The method can further include identifying, in the computing device, the unique object identifier based on the computing device performing an image detection operation of a physical symbol that has encoded the unique object identifier, wherein the physical symbol also encodes an identifier for the first computing system. The computing device may not receive the unique object identifier from the first computing system before the computing device forwards the first information request to the first computing system. The method can further include receiving, in the computing device and from the first computing system in response to the first information request, an indication that the first computing system has stored the first information. The method can further include transmitting, by the computing device and to the first computing system, a third request that the first computing system transmit the first information to the computing device. Said receiving of the first information may be performed in response to the third request.

The first computing system may select the identifier for the second computing system for transmission to the computing device based on the first computing device having received the unique object identifier from the second computing system at a time that is before the computing device identifies the unique object identifier. The first information and the second information may not include (i) the unique object identifier, and (ii) identifiers for the first computing system and the second computing system. The computing device may store the unique object identifier, an identifier for the first computing system, and the identifier for the second computing system in an Extensible Markup Language (XML) document. The method may further include identifying, in the computing device, the unique object identifier based on the computing device performing an image detection operation of a physical symbol that has encoded the unique object identifier, wherein the physical symbol may also encode an identifier for the first computing system. The computing device may not receive the unique object identifier from the first computing system before the computing device forwards the first information request to the first computing system.

Another aspect of the subject matter described in this specification can be embodied in a computer-implemented method for discovering information that is related to a unique object identifier from a decentralized collection of computing systems that have stored information in association with the unique object identifier. The method includes identifying, in a computing device, a unique object identifier. The method includes propagating, from the computing device through a series of additional computing systems, a first information request that includes the unique object identifier and that prompts the additional computing systems to send to the computing device information that each of the additional computing systems has stored in association with the unique object identifier. The series of additional computing systems are computing systems that earlier communicated the unique object identifier through the series of additional computing systems in a direction that is opposite of a direction of the propagating first information request. The method includes receiving, in the computing device and from each of the additional computing systems, the information that each of the additional computing systems has stored in association with the unique object identifier.

Another aspect of the subject matter described in this specification can be embodied in a computer-implemented method for registering a unique object identifier in a decentralized collection of computing systems. The method includes generating, in a first computing system, a unique object identifier. The method includes propagating, from the first computing system through a series of additional computing systems, the unique object identifier, so as to cause each particular computing system of the series of additional computing systems to: (i) receive the unique object identifier, (ii) store the received unique object identifier, and (iii) store an indication of a computing system that sent the unique object identifier to the particular computing system.

Another aspect of the subject matter described in this specification can be embodied in a computer program product tangibly embodied in a computer-readable storage device and comprising instructions that when executed perform a method for registering a unique object identifier in a decentralized collection of computing systems. The method includes generating, in a first computing system, a unique object identifier. The method includes propagating, from the first computing system through a series of additional computing systems, the unique object identifier, so as to cause each particular computing system of the series of additional computing systems to: (i) receive the unique object identifier, (ii) store the received unique object identifier, and (iii) store an indication of a computing system that sent the unique object identifier to the particular computing system.

Another aspect of the subject matter described in this specification can be embodied in a system that includes a programmable processor; and a computer-readable storage device coupled to the processor and having instructions stored therein, which when executed by the processor causes the processor to perform a method for registering a unique object identifier in a decentralized collection of computing systems. The method includes generating, in a first computing system, a unique object identifier. The method includes propagating, from the first computing system through a series of additional computing systems, the unique object identifier, so as to cause each particular computing system of the series of additional computing systems to: (i) receive the unique object identifier, (ii) store the received unique object identifier, and (iii) store an indication of a computing system that sent the unique object identifier to the particular computing system.

Particular embodiments can be implemented, in certain instances, to realize one or more of the following advantages. Information that is associated with a single unique identifier across multiple systems that are decentralized may be retrieved. The systems may be administered by different organizations. Each organization may be able to control access to its own information, and establish its own security regime. A third party system as a central authority system may not be necessary to govern retrieval of information among multiple different systems. Information that a sequence of systems that have communicated a unique identifier have stored in association with the unique identifier may be obtained by any of the systems in the sequence, or any device or system that communicates with any of the systems in the sequence.

The details of one or more embodiments are set forth in the accompanying drawings and the description below. Other features, objects, and advantages will be apparent from the description and drawings, and from the claims.

DESCRIPTION OF DRAWINGS

FIGS. 5 and 6 show an XML schema that may be used to implement registration and discovery of unique object identifiers.

Like reference symbols in the various drawings indicate like elements.

DETAILED DESCRIPTION

Figure 1A:
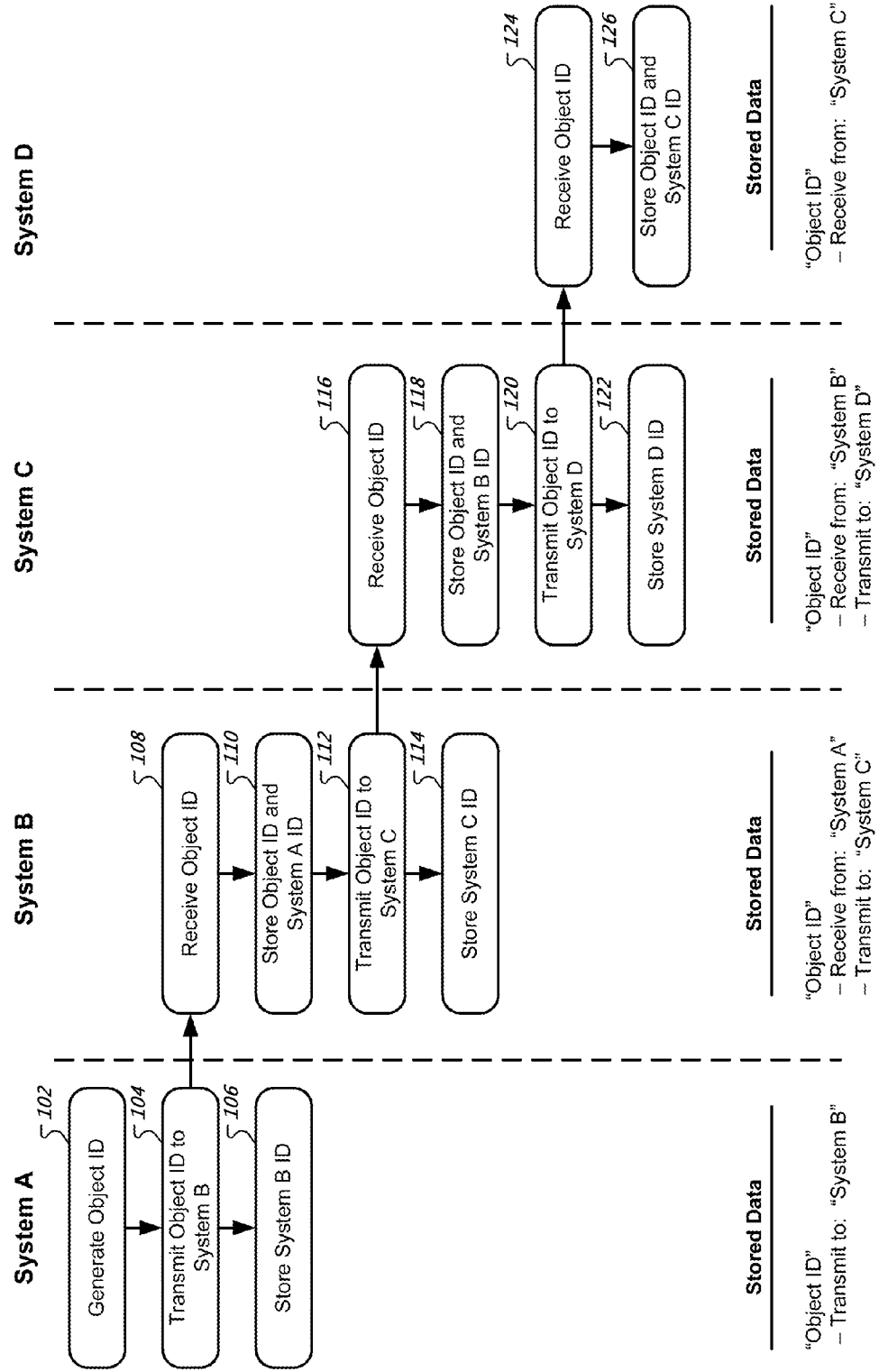
FIG. 1A shows a swim-lane diagram of a process for registering a unique object identifier across systems.

This document generally describes examples of registering and discovering objects that have been uniquely identified (herein referred to as unique identifiers, object identifiers, or unique object identifiers). Such registration or discovery of unique identifiers may occur across a collection of systems. The collection of systems may be administered by one or more organizations.

More specifically, a unique object identifier may uniquely identify an instance of an object (or a resource) worldwide across systems within an identification scheme. In some implementations, such an identifier may be analogous to a social security number that is assigned to persons for their whole lifetime. Here, a number (or any other combination of numbers, letters, and characters) is assigned to the complete life-cycle of a product, part, component assembly, asset, software version, plan, computerized device, person, credit card, business document, engineering document, business object, physical site, or virtual location, to name just a few examples.

Some mechanisms described herein permit automated discovery of information that is relating to a unique identifier across distributed systems. The unique identifier may be assigned to an object, and may remain unaltered across a lifetime of the object. Further, the systems that include information relating to the unique identifier may be assigned globally unique computer identifiers within an identification scheme. A unique computer system identifier can include a uniquely resolvable address or computer name for a computer system.

Computer systems may transmit a unique identifier in a sequence from one computer system to the next; for example, while a physical product is transferred from a production facility to a wholesaler, to a retailer, to the customer, and to a repair facility. Each system may store one or more identifiers for other systems in the sequence, such as an identifier for the system that sent the unique identifier and from which the unique identifier was received from (e.g., a sending system identifier), and/or an identifier for the system to which received the unique identifier and to which the unique identifier was transmitted (e.g., a receiving system identifier). Each of these systems may generate and store information in association with the unique identifier after receipt and transmittal of the unique identifier. In some implementations, such information is known only to a single system in the sequence prior to discovery of the information by other systems.

At some later point in time when a device (e.g., one of the systems in the sequence, or another system) receives a request to obtain information that has been stored in association with the unique identifier, the device may initiate a process to gather the information from all of the systems in the sequence. In such a decentralized system, no single system may store all of the information that is stored in association with a unique identifier, and no single system may store indications of all the systems that have stored information on the unique identifier. Thus, the systems may need to relay the request from system to system. These operations are described in more detail with respect to the figures.

FIG. 1A shows a swim-lane diagram of a process for registering a unique object identifier across systems. In this example, an object identifier is transferred from an organization or other entity, here referred to as a first business partner, to a second business partner. Then, the object identifier is transferred from the second business partner to a third business partner, and so forth in a sequence. In some implementations, the first business partner does not transmit data directly to the third business partner, and in some examples is not aware of the third business partner (e.g., the first business partner does not store an identifier for the third business partner). Each separate computer system that is described in examples herein may be operated by different business partners.

As an illustration, system A indicated in FIG. 1A may be administered by a manufacturer that has manufactured a product. Upon manufacture of the product, the manufacturer's system assigns the product a globally unique identifier (as illustrated in box 102). For example, the manufacturer may have been allocated a manufacturer identifier of "11111" by an identifier-designating authority that allocates a portion of a namespace of identifiers for use by the identifier. The product may be a particular instance of a type of product (e.g., a single bottle of vitamins of a particular type of vitamins that are manufactured by the manufacturer). The manufacturer may assign the identifier "222" to the particular type of product, and in this example the particular bottle is the 97th bottle made. Thus, the manufacturer may assign the identifier "11111-222-0097" to the bottle.

As illustrated in box 104, the object identifier is transmitted to system B. For example, in connection with the product being shipped to a wholesaler, computer system A may transmit the object identifier to computer system B, for example, in a transmitted delivery order, an Advance shipping notification (ASN), or an EDIFACT or XML message/web service. The object identifier may also or instead be placed on the product itself or otherwise affixed thereto. For example, the receiving business partner may obtain the object identifier by scanning a code, tag or other marker on the product that bears an instance of the object identifier.

As illustrated in box 106, system A stores the object identifier, and in association with the object identifier, stores a receiving system identifier for system B as the system to which the object identifier was sent. In various examples, the object identifier may be stored in a database, and the receiving system identifier for system B may be stored as data that is relating to the object identifier in the database.

The data that is stored for system A upon the completion of the steps in the swim-lane for system A is illustrated at the bottom of the swim-lane. For example, the stored data "Object ID" is stored upon the actions that are illustrated in box 102. The stored data "System B" is stored upon the actions that are illustrated in box 106. Although a single object identifier is illustrated, system A may store multiple object identifiers for multiple respective objects, and may store associated information for each of the multiple object identifiers.

As illustrated in box 108, system B receives the object identifier from system A. System B may also receive a sending system identifier for system A (e.g., a static IP address or a unique identifier that remains unaltered over time for system A). As illustrated in box 110, system B stores the received object identifier, and may further store the sending system identifier for system A in association with the object identifier.

As illustrated in box 112, system B transmits the object identifier to system C, for example, in a delivery order for delivering the product to a retailer. Upon transmission of the object identifier, system B may store an indication that the object identifier was transmitted to system C (as illustrated in box 114). [REM: Good catch—yes it is system C]

As illustrated in box 116, system C receives the object identifier and, as illustrated in box 118, stores the object identifier and an indication of system B as the transmitting system. As illustrated in box 120, the object identifier is transmitted to system D as the product is transferred to a repair technician. As illustrated in box 122, system C may store the receiving system identifier for system D in association with the object identifier.

As illustrated in box 124, system D receives the object identifier, and, as illustrated in box 126, stores the object identifier and the sending system identifier for system c.

In this illustration, an object identifier for a product is passed from system to system as the object is physically moved between organizations. Each organization may have its own system and mechanisms for storing data that is generated in connection with the unique identifier. For example, the manufacturer may store the materials that were used in generation of the product, the individuals that worked on manufacturing the product, and the facilities that the product was manufactured at. The wholesaler's system may store locations that the product was stored at, purchase price, and selling price. The retailer's system may store a date of sale, and an identity of a customer to which the product was sold.

The repair technician's system may store an indication of the product defects and corrective actions. Such information may not be transferred with an initial registration of the object identifier. Indeed, the information may have been generated after registration of the object identifier at each of the systems (e.g., after the object identifier has been registered at all systems in the sequence).

An organization that stores information in association with the object identifier may deem at least some of the information confidential. Thus, some systems may require security credentials by internal and external requesters to access portions of information. Accordingly, organizations may not desire that such information be stored at a centralized system that collects all information that is associated with the object identifier. Rather, the organizations may already have mechanisms for storing such information, and authentication schemes for accessing the information. Furthermore, a centralized authority or system may not remain in business and an ability to communicate with other systems may be lost if the centralized system no longer operates.

In some examples, each of the organizations may operate different software application programs that store object identifiers and information associated therewith, and may use an interface to process business documents that are received from other systems. In some examples, the sequence of computer systems that registers an object identifier does not correspond to physical movement of the corresponding object. For example, the retailer may have sold the product to a customer, but the customer may not administer a system for storing information on the purchase. The customer, however, may send the product to the repair technician for repair. Upon receiving the product, the repair technician may determine that the product was sold from the retailer, and may send a communication to the retailer informing the retailer that the product is being repaired. In response, the retailer may transmit the object identifier to the retailer.

In another example, the retailer may not have a computer system for storing object identifiers. Thus, the sequence of object identifiers for a product may end at a wholesaler. The manufacturer (e.g., system A) may, however, transmit object identifiers for manufactured products to the repair technician's system (e.g., system D) upon manufacture and before the repair technician has received the products. At some later point in time, a customer may send the product to the repair technician. The repair technician may then use the object identifier for the product to discover information about the product form the manufacturer, and possibly other systems downstream from the manufacturer (e.g., system B).

Accordingly, the information that is stored or generated in association with an object identifier may be stored in a decentralized manner among the distributed systems. The systems, however, may perform mechanisms to collect information from multiple systems in the stream of communication.

In some examples, when a first system transmits a unique object identifier to a second system, the first system transmits not only a receiving system identifier for the first system, but also transmits identifiers for further upstream systems. The term "upstream" is used with reference to a particular computing system to refer to those computing systems that registered the object identifier before to the particular computing system, and that passed the object identifier to the particular computing system or through a sequence of computing systems to the particular computing system. The term "downstream" is used with reference to a particular computing system to refer to those computing systems that registered the object identifier after the particular computing system, and to which the particular computing system passed the object identifier directly or in a sequence of computing systems. As an illustration, system B would store system A as an upstream system. Thus, when system B transmits the object identifier to system C, system B transmits identifiers for systems A and B. Thus, system C can store identifiers for both systems A and B, and thus may be aware of more than one upstream system through which the identifier passed on its way to system C.

In other words, in a further embodiment a system may communicate not only the single system identifier of its immediate upstream system, but may also communicate the system identifiers of other upstream systems. There may be no need to store the identifiers of all upstream systems. In other words, by enhancing a storage of system identifiers to "pedigree lists" of multiple upstream systems, the discovery can select suitable systems form the list and bypass requests to some intermediate upstream systems. This approach may speed up the discovery process (that is explained in more detail below) and thus may allow higher reliability of the discovery process.

Figure 1B:
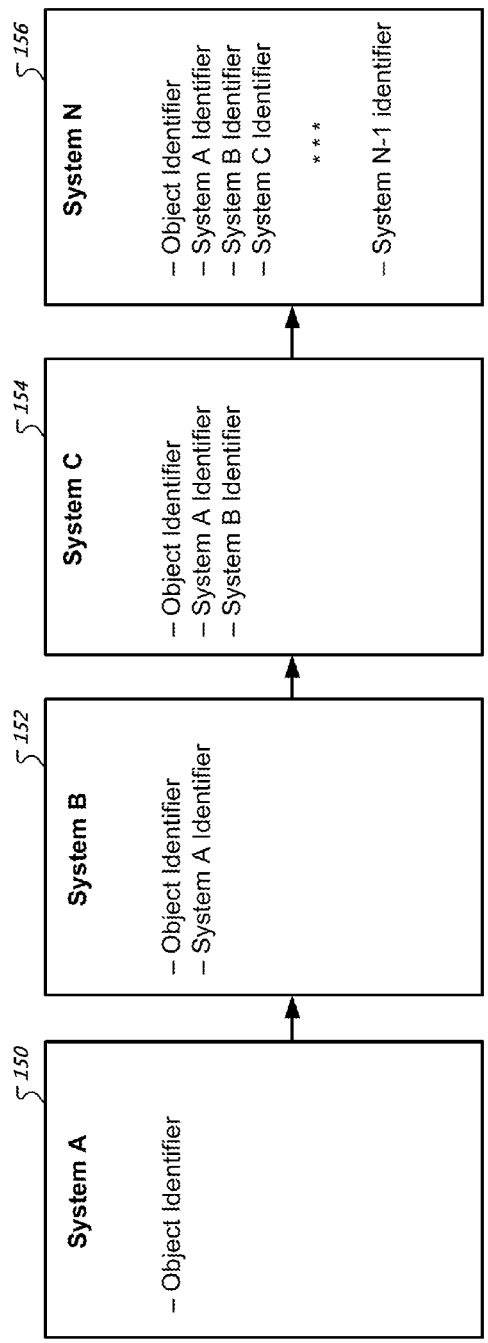
FIG. 1B shows a diagram of a process for registering a pedigree of systems storing data that is associated with a unique object identifier.

This further embodiment is illustrated in FIG. 1B. In this example, system A initiates a registration process by sending the object identifier to system B. System B stores the object identifier and an sending system identifier for system A. System B then send to system C the object identifier, along with sending system identifiers for both systems A and B. Thus, system C stores identifiers for more than one upstream sending system. This process may continue for multiple additional systems. For example, system N stores sending system identifiers for at least systems A, B, C, and N–1. At a later point in time, should system N–1 perform a discovery process, system N–1 may directly query each of the upstream systems to determine if the upstream systems store data in association with the object identifier.

In some examples, a single system may have multiple downstream systems to which the system transmitted an object identifier. Thus, a conceptual representation of systems that have information about a unique object identifier may appear as a hierarchal tree with multiple systems at each level of the hierarchy. A system, in some examples, may know of all systems in a direct stream upward, but may not know of "sibling" systems at the same level in the hierarchal tree, and may not know of sibling systems to a parent node.

Figure 2:
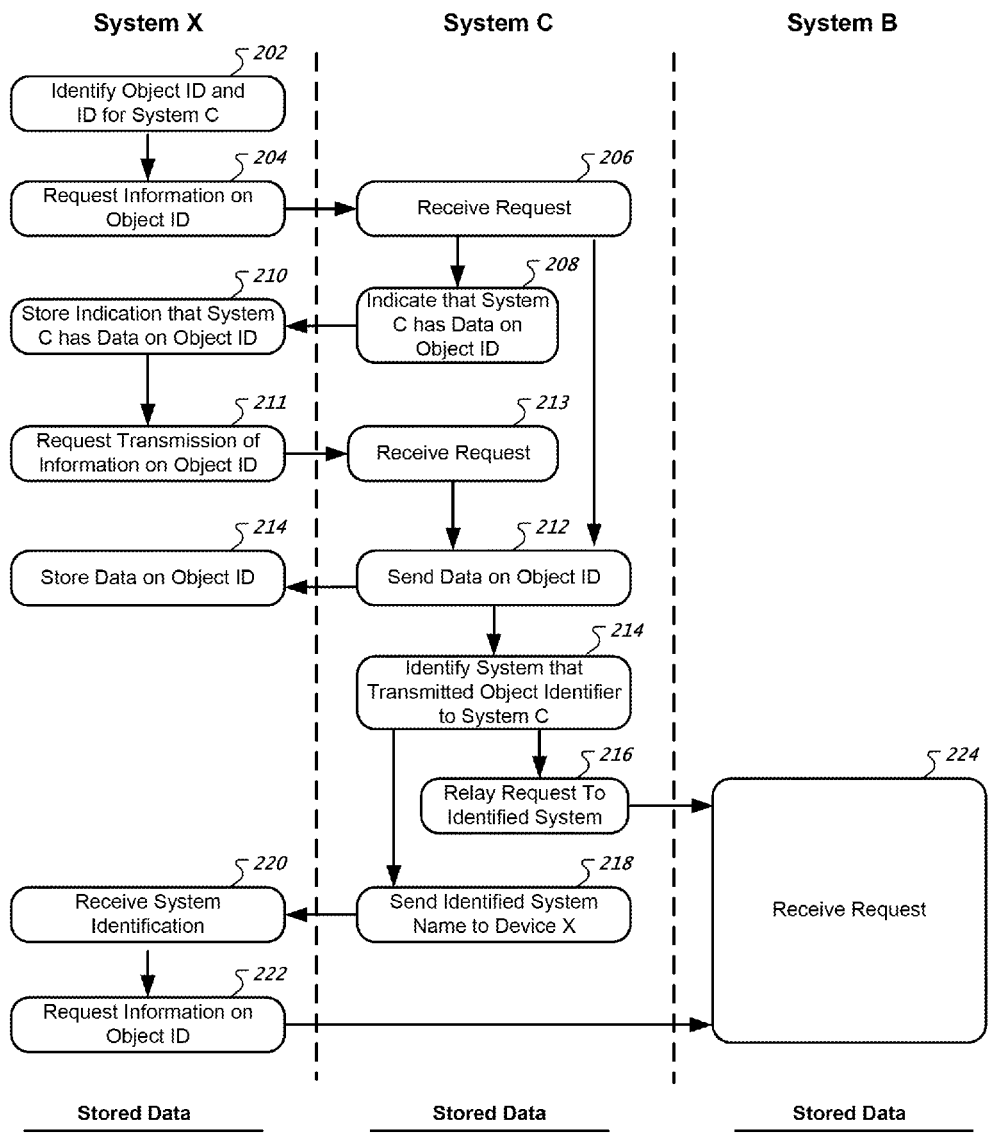
FIG. 2 shows a swim-lane diagram of a process for discovering systems that have stored a unique object identifier.

FIG. 2 shows a swim-lane diagram of a process for discovering systems that have stored a unique object identifier. This process is described with respect to a device of an individual consumer. The individual seeks to obtain information about an object identifier that has been stored among a sequence of systems that have registered an object identifier (e.g., the systems described with respect to FIG. 1A). The device may or may not be any of the devices in the sequence of systems.

In this illustration, a customer in a pharmacy would like information to be displayed on his mobile telephone about a bottle of vitamins that the pharmacy has for sale. The customer may enter the bottle of vitamin's unique object identifier into the mobile telephone manually or by an automated operation. For example, the user may use the mobile telephone to perform an image detection operation of the data matrix or bar code that is displayed on the bottle (e.g., by taking a picture or using a laser scanning process). The object identifier may also or instead be obtained using radio-frequency identification or by user typing of the object identifier into the mobile telephone.

The information that is stored in association with the unique object identifier may not be stored in a centralized database. Thus, an identifier for a single centralized system may not be preconfigured into the mobile telephone. Instead, the mobile telephone may need to receive an identifier for a computer system at which to begin a decentralized discovery process.

In some examples, the discovery process begins at the pharmacy computer system. The customer may enter an identifier for the pharmacy computer system, for example, by taking a picture of an identifier for the pharmacy computer system that is on display at the pharmacy. In some examples, the user enters the object identifier at a web page for the pharmacy. The web page for the pharmacy may include the identifier for the pharmacy computer system so that the user of the mobile telephone does not need to enter the identifier for the pharmacy computer system. In some examples, the data matrix on the bottle includes both the object identifier and the computer system identifier. For example, the label on the bottle may be specific to the pharmacy retail chain.

As illustrated in box 202, system X (e.g., the mobile telephone) identifies an object identifier and the identifier for system C. For example, the mobile telephone receives indications of the product identifier and the system identifier based on a scan of one or more data matrixes. In various examples, system X may not previously have stored the object identifier or the system identifier. In other words, system X does not need to be a system that took part in the registration process that is described with respect to FIG. 1A.

As illustrated in box 204, system X sends a request to system C. The request includes at least the object identifier. As illustrated in box 206, system C receives the request and determines whether or not system C includes information on the object identifier. As an example, the pharmacy's computer system may receive a request over the internet from the mobile telephone. In response, the pharmacy's computer system may query a database of product identifiers to determine if product information is available for the object identifier. The system may locate the object identifier in the database, and may respond to the mobile computing device in one of two alternative implementations.

In a first implementation (as illustrated in box 212), system C sends to system X the information that system C has stored in association with the object identifier. For example, the pharmacy may send to the mobile telephone information that describes the ingredients in the vitamins and any health benefits that are associated with taking the vitamins. The information may be sent as a first communication to system X upon system C receiving the object identifier.

In a second implementation (as illustrated in box 208), system C indicates to system X that system C has stored data for the object identifier. As illustrated in box 210, system X receives the indication that system C has stored data for the object identifier, and stores the indication. As illustrated in box 211, system X requests that system C transmit the information that system C has stored in association with the object identifier. For example, upon system X receiving indications of multiple systems that have information about the object identifier (e.g., upon further "discovery" of upstream systems as described below), system X may request such information from one or more of the systems. As illustrated in box 213, the request is received at system C. In response, system C sends the data to system X (as illustrated in box 212), and system X stores the data (as illustrated in box 214).

At this stage in the process, system C performs operations for "discovering" other systems that have information about the object identifier. First, system C identifies the system that originally transmitted the object identifier to system C during the object identifier registration process (as illustrated in box 214). For example, and with reference to FIG. 1A, system C may determine that it previously received the object identifier from System B. The discovery of the other systems may occur in either of two alternative implementations.

In a first implementation (as illustrated in box 218), system C sends to system X the one or more sending system identifiers for the one or more systems that transmitted the object identifier to system C. As illustrated in box 220, system X receives the one or more sending system identifiers for the one or more systems that transmitted the object identifier to system C. In the illustration, system B sent the object identifier to system C during the registration process (see the description with reference to boxes 112 and 116, and the stored data for System C in FIG. 1A). As illustrated in box 222, system X requests information on the object identifier from system B, for example, in a manner similar to the operations that are illustrated in box 204.

In a second implementation (as illustrated in box 216), system C does not transmit to system X the sending system identifier for system B. Instead, system C relays the request for information to system B.

As illustrated in box 224, system B receives the request for information that is stored in association with the object identifier. The request may be received from either system X or from system C. System B can repeat the operations that are performed by system C (e.g., the operations that are illustrated in boxes 208, 212, 214, and 216, or sub-combinations thereof).

As an example, system B may send to system X an indication that system B has information stored in association with the object identifier. System X may then request the information. Alternatively, system B may send the information to system X directly without a separate transmission that acknowledges that such information is stored at system B. Further discovery may take place with system B either transmitting to system X indications of upstream systems that sent system B the object identifier, or by system B relaying the request for information to the upstream systems. If there are no more upstream systems, such an indication may be transmitted to system X, or no response to the request for information may be received at system X.

In various examples, system X may not have previously communicated with systems C or B prior to the transmission of the request 204. In various examples, each of systems C and B may have stored multiple object identifiers, and, with each identifier, a collection of associated information. The collections of associated information may have been generated at each computer system following the registration process that illustrated in FIG. 1A. In other words, the information could not have been transmitted during the registration process because the information had yet to be created.

In examples where the object registration process includes sending identifiers for all upstream computer systems (as described above), a downstream computer system may receive identifiers for all upstream computer systems prior to a discovery process. Thus, the downstream computer system may directly query each upstream computer system individually to request information that has been stored in association with an object identifier. The upstream computer systems may not need to "relay" the request onto other computer systems, or transmit to the downstream computer system identifiers of other upstream computer systems.

Figure 3:
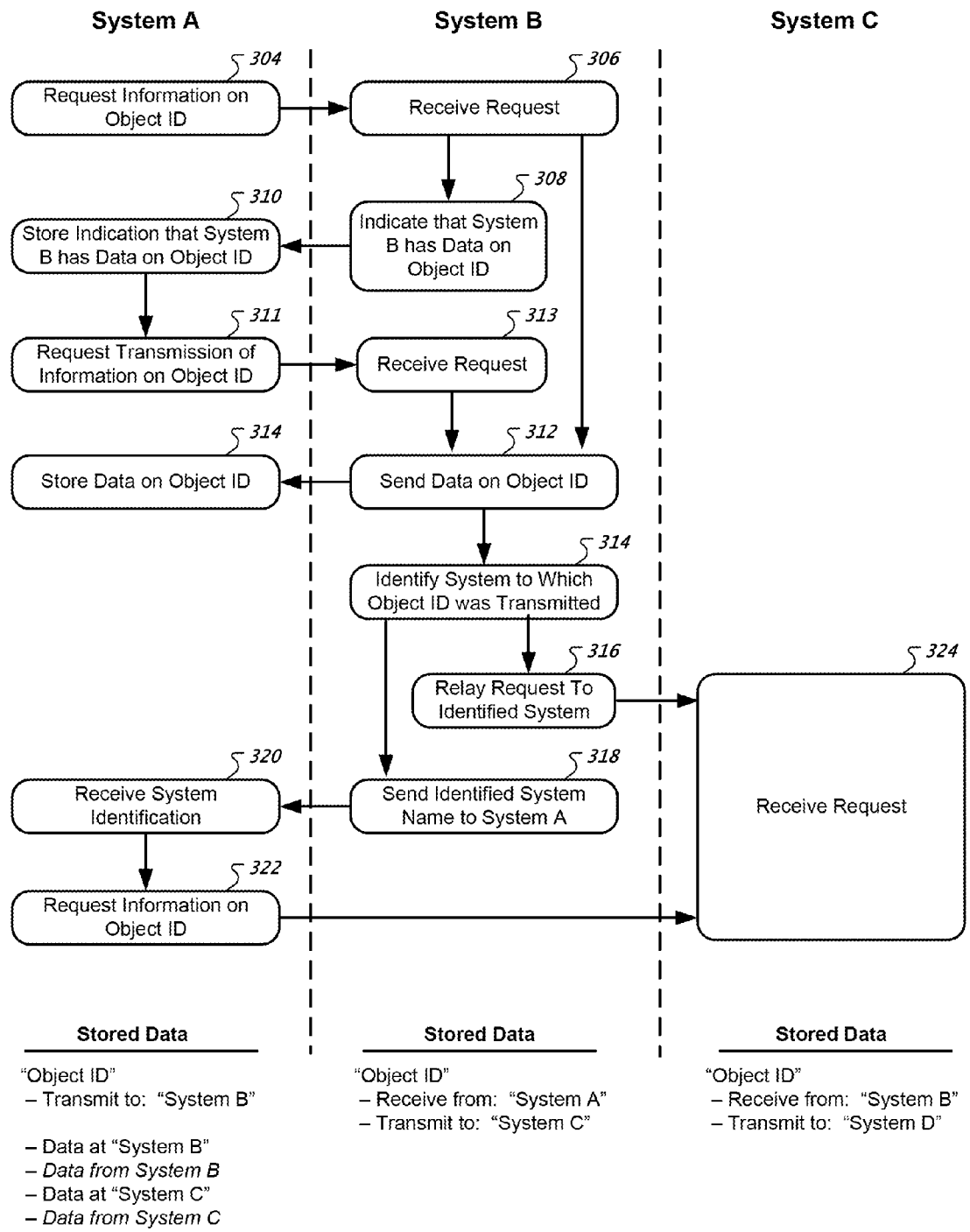
FIG. 3 shows a swim-lane diagram of another process for discovering systems that have stored a unique object identifier.

FIG. 3 shows a swim-lane diagram of another process for discovering systems that have stored a unique object identifier. The process that is illustrated in FIG. 3 is similar to the process that is illustrated in FIG. 2. Both processes involve a computer system discovering information that is associated with an object identifier from among a decentralized collection of systems. FIG. 3, however, illustrates a process where the requesting system is an upstream system that is requesting information from downstream systems.

For example, system A in this example may represent a system for a manufacturer of a product. As illustrated in FIG. 1A, system A may have transferred the object identifier to system B, which may have transferred the object identifier to system C. At some later point in time, a user of the manufacturer's system may wish to view information that has been generated by the downstream systems. This process is briefly described in the following paragraphs. The description of the process illustrated in FIG. 2, however, is similar and provides additional implementation details.

As illustrated in box 304, system A requests from system B information on an object identifier. System A may have stored the object identifier and may have previously communicated with system B. Indeed, system B may previously have received the object identifier from system A. System A may transmit the request to system B based on system A identifying that system A previously sent the object identifier to system B during a registration process. In some examples, system A sends the request to all systems to which system A sent the object identifier for registration.

As illustrated in box 306, system B receives the request. In a first implementation, system B may send to system A an indication that system B has information about the object identifier (as illustrated in box 308). In response, system A may receive the indication and request transmission of the information (as illustrated in boxes 310 and 311). System B may then receive the request and send the data (as illustrated in boxes 313 and 312). In a second implementation, system B may immediately send the data (as illustrated in box 312). System A may then receive and store the data (as illustrated in box 314).

System B may then perform a process for discovering more information that has been stored in the decentralized system in association with the object identifier. For example, system B may identify one or more systems to which system B transmitted the object identifier during a registration process (as illustrated in box 314). In a first implementation, system B may then send such one or more receiving system identifiers to system A, which may receive the receiving system identifiers (as illustrated in box 320) and may request transmission of information on the object identifier from system C (as illustrated in box 322). In a second implementation, system B may relay the request to system C (as illustrated in box 316). System C may receive the request and repeat the actions that have been described with respect to system B. The process may continue with additional systems until system A receives no additional transmissions of information that have been stored in association with an object identifier, or until system A receives no additional transmissions of systems that have been identified as downstream systems.

Figure 4:
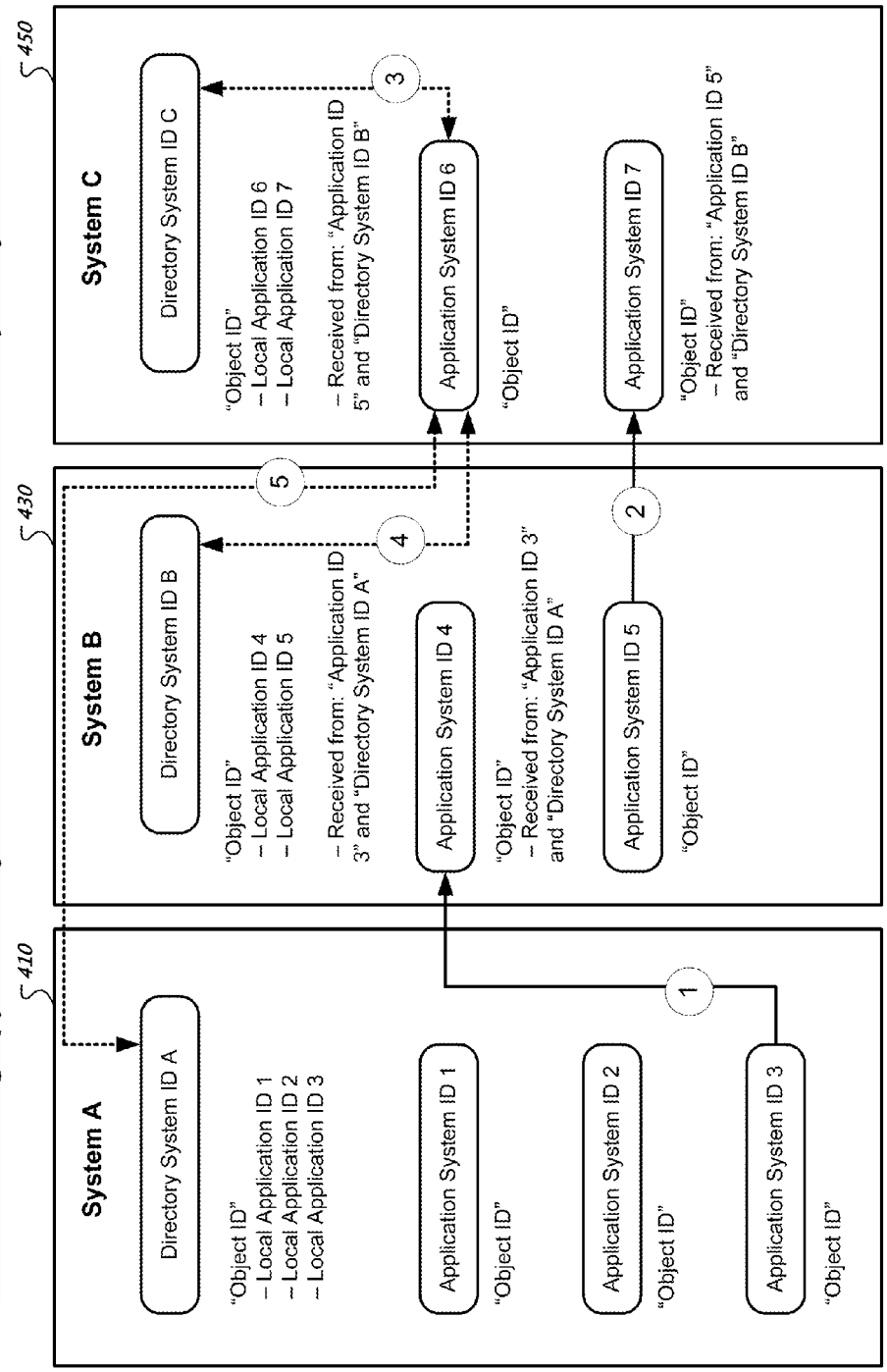
FIG. 4 shows a diagram of a process for registering a unique object identifier across computer systems with multiple application systems, and discovering application systems that have data about the unique object identifier.

FIG. 4 shows a diagram of a process for registering a unique object identifier across computer systems with multiple application systems, and discovering application systems that have data about the unique object identifier. Each of the computer systems that is shown in FIG. 4 (i.e., computer system A 410, computer system B 430, and computer system C 450) include multiple application systems (denoted by their application system identification numbers). Each application system may be an instance of executing software that can register information about an object identifier. Each application system may include its own database for storing the object identifiers.

As an illustration, a single computer system that is operated by an organization may operate multiple different software application programs. The marketing department may operate a first software application program, the shipping department may operate a second software application program, and the customer service department may operate a third software application program. Each computer system may include a directory of object identifiers that are stored at the computer system by the application programs, and the application programs at which the object identifiers are stored.

Registration and discovery of information that is stored in association with an object identifier among multiple software application programs at multiple computer systems may be performed. For example, application system 3 may have stored an object identifier, and may transmit the object identifier to application system 4 at system B. The object identifier is shown as replicated among the other application systems at computer system A; however, such replication may not occur upon an application program receiving an object identifier.

Application system 4 at computer system B receives the object identifier, along with an indication of the transmitting application system and a directory identifier for the directory system of computer system A. Application system 4 stores the object identifier, the indication of the transmitting application system, and the directory identifier for directory system A (as illustrated below the Application System ID 4 box). The object identifier is replicated by computer system B to application system 5.

Application system 5 transmits the object identifier to application system 7, which stores the object identifier and information detailing the transmitting application system and directory system. The object identifier is replicated to application system 6.

At some later point in time, application system 6 initiates a process for discovering information that is stored in association with the object identifier (e.g., in response to user input). Application system 6 begins this process by identifying the application systems that have stored the object identifier. In this example, application system 6 first queries the directory for computer system C (i.e., directory C). Directory C returns a response that identifies application programs 6 and 7. Also, the directory previously stored information indicating an origin of the object identifier at computer system C (e.g., the text "Received from: 'Application ID 5' and 'Directory System ID B'"). Directory C also returns this information to application system 6.

The returned information indicates that the origin of the registration process was application program 5, which is affiliated with directory system B. Thus, application system 6 transmits the request to directory system B, which returns indications of applications systems 4 and 5 as having stored the object identifier, and also returns an indication of application system 3 and directory system A as being an origin of the object identifier. Finally, application system 6 sends a request to directory system A and receives back indications of application systems 1, 2, and 3, but may not receive back an indication of an application program or directory system that transmitted the object identifier to computer system A. This lack of further indication may be an indication that computer system A is the most upstream computer system.

At this point, application system 6 may have application program identifiers for all the application programs that have stored the object identifier. Application system 6 may then send to each of the application programs a request to transmit information that is stored in association with the object identifier.

Figure 6:
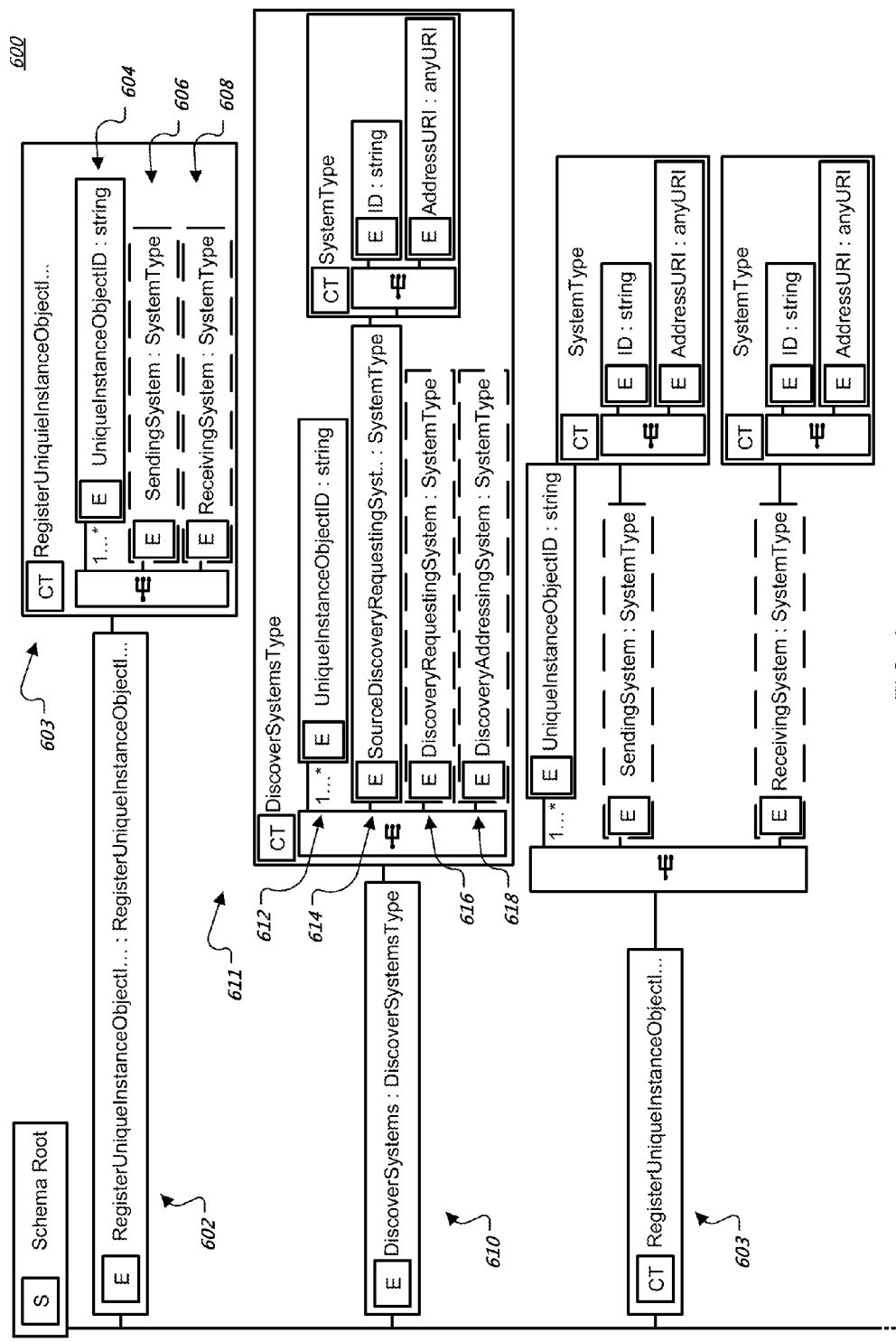
Figure 6:
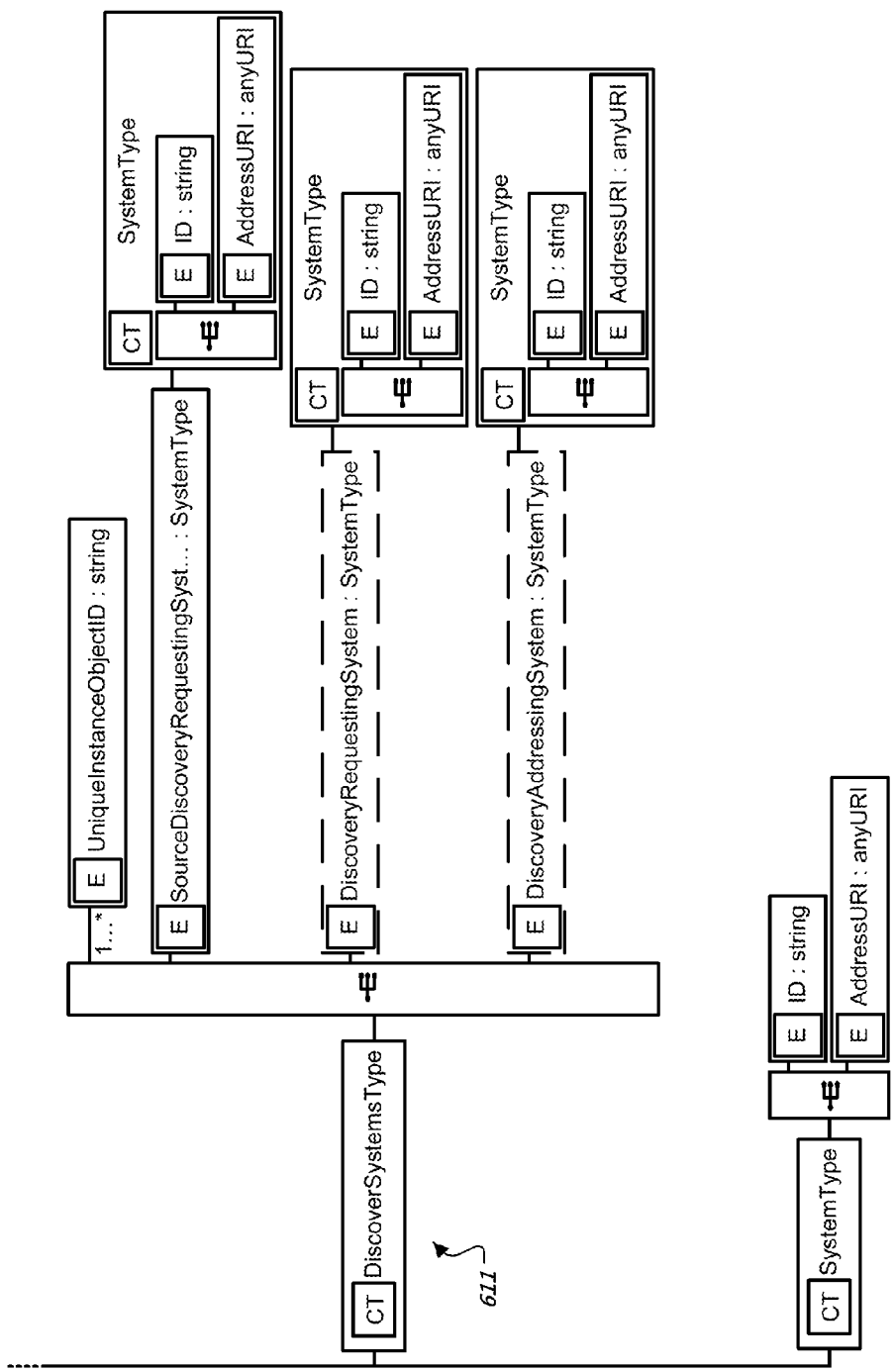

FIGS. 5 and 6 show an XML schema that may be used to implement registration and discovery of unique object identifiers. A schema formally describes what a given XML document may contain, and may describe a basic shape of an XML document, such as what fields an element can contain, which sub-elements the element can contain, and the values that can be placed into any element. FIG. 5 shows a textual view 500 of such an XML schema document, while FIG. 6 shows a graphical view 600 of the schema.

Each system that is described throughout this document may contain an XML document that is generated in accordance with the described schema. The XML document may identify multiple unique object identifiers, and for each object identifier, a sending system identifier for a system that sent the identifier to the system and a receiving system identifier for a system to which the identifier was sent.

For example, the graphical view 600 of the schema specifies that an instance document that is generated from the schema may include an element 602 that is named "RegisterUniqueInstanceObject." This element may be a complex type element 603 that includes a potentially unbounded quantity of elements 604 that are named "UniqueInstanceObjectID" and that include a string. For each UniqueInstanceObjectID element, the RegisterUniqueInstanceObject element may include a SendingSystem element 606 and a ReceivingSystem element 608. The textual view 500 of the schema may include corresponding elements (502 through 508).

The graphical view of the schema may also specify an element for storing indications of systems that have been discovered. For example, the DiscoverSystems element 610 may be a complex type 611 that includes a potentially unbounded quantity of the UniqueInstanceObjectID element 612. For each of these elements, the system may store a SouceDiscoveryRequestingSystem element 614 (e.g., an identifier for a system that originated a discovery request), a DiscoveryRequestingSystem element 616 (e.g., an identifier for a system that sends a query to another system to discover other systems that store information in association with a given object identifier), and a DiscoveryAddressingSystem element 618 (e.g., an identifier of a system that has been queried as potentially having stored information in association with an object identifier, and that may return a response whether the system has data that is stored in association with the object identifier and provide data about other systems that have stored data in association with the object identifier). The textual view 500 of the schema may include corresponding elements (510 through 518).

Figure 7:
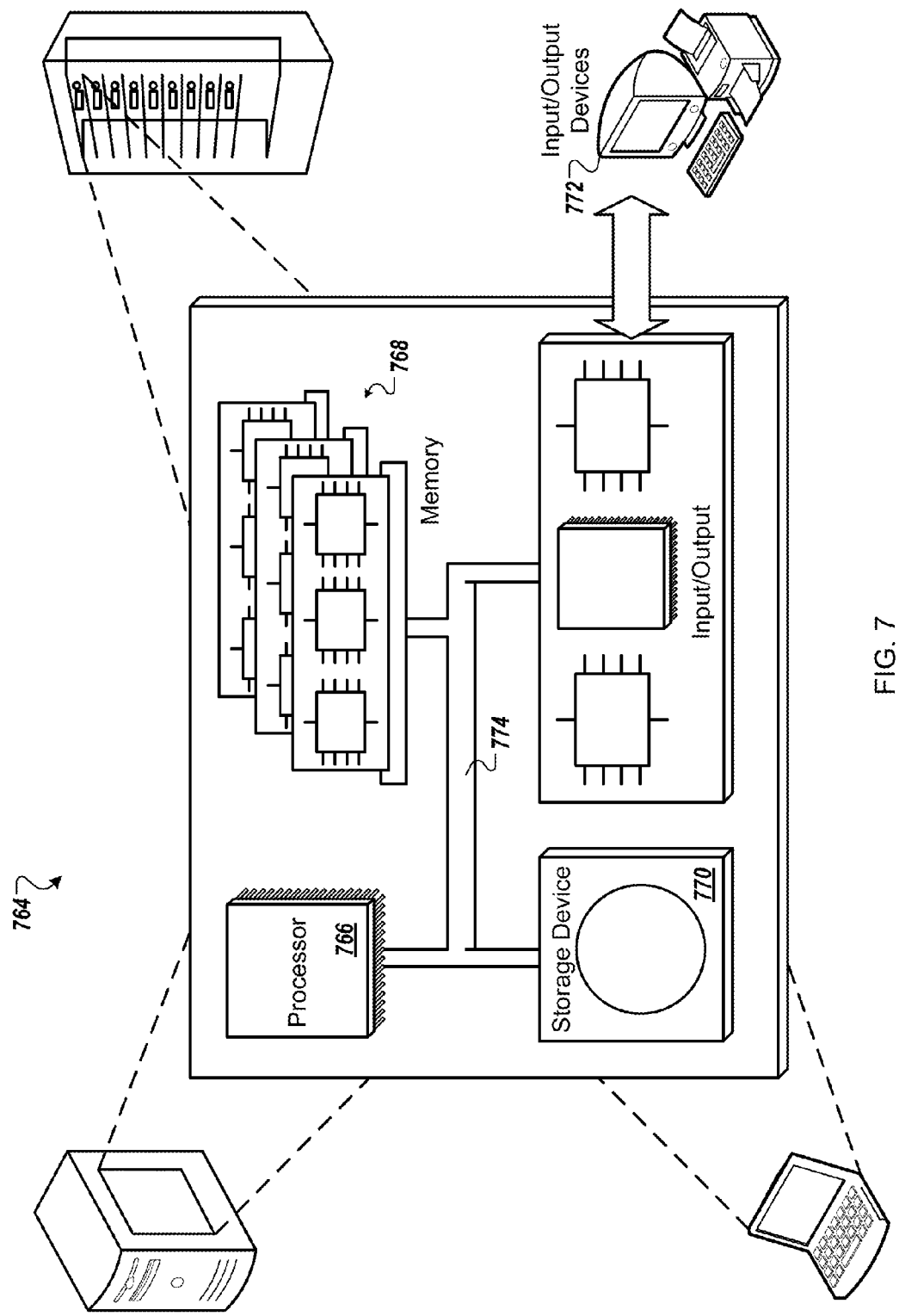
FIG. 7 is a block diagram of computing devices that may be used to implement the systems and methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, and BLU-RAY ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for discovering information that is related to a unique object identifier from a decentralized collection of computing systems that have stored information in association with the unique object identifier, the method comprising:
    identifying, in a computing device, a unique object identifier that a third computing system had previously transmitted to a second computing system, and that the second computing system had previously transmitted to a first computing system, wherein:
        (i) the first computing system stores first information in association with the unique object identifier,
        (ii) the second computing system stores second information in association with the unique object identifier, and
        (iii) the third computing system stores third information in association with the unique object identifier;
    forwarding, from the computing device and to the first computing system, a first information request that includes the unique object identifier;
    receiving, in the computing device and from the first computing system in response to the first information request, the first information that the first computing system has stored in association with the unique object identifier;
    receiving, in the computing device and from the first computing system in response to the first information request, an identifier of the second computing system;
    forwarding, from the computing device and to the second computing system as a result of having received the identifier of the second computing system from the first computing system, a second information request that includes the unique object identifier;
    receiving, in the computing device and from the second computing system in response to the second information request, the second information that the second computing system has stored in association with the unique object identifier,
    receiving, in the computing device and from the second computing system in response to the second information request, an identifier of the third computing system;
    forwarding, from the computing device and to the third computing system as a result of having received the identifier of the third computing system from the second computing system, a third information request that includes the unique object identifier; and
    receiving, in the computing device and from the third computing system in response to the third information request, the third information that the third computing system has stored in association with the unique object identifier.

2. The computer-implemented method of claim 1, further comprising identifying, in the computing device, the unique object identifier based on the computing device performing an image detection operation of a physical symbol that has encoded the unique object identifier, wherein the physical symbol also encodes an identifier of the first computing system.

3. The computer-implemented method of claim 1, wherein the computing device does not receive the unique object identifier from the first computing system before the computing device forwards the first information request to the first computing system.

4. The computer-implemented method of claim 1, further comprising:
    receiving, in the computing device and from the first computing system in response to the first information request, an indication that the first computing system has stored the first information; and
    transmitting, by the computing device and to the first computing system in response to receiving the indication that the first computing system has stored the first information, a request that the first computing system transmit the first information to the computing device,
    wherein said receiving of the first information is performed in response to the request that the first computing system transmit the first information to the computing device.

5. The computer-implemented method of claim 1, wherein the first information and the second information do not include (i) the unique object identifier, and (ii) identifiers for the first computing system and the second computing system.

6. The computer-implemented method of claim 1, wherein the computing device stores the unique object identifier, an identifier of the first computing system, and the identifier of the second computing system in an Extensible Markup Language (XML) document.

7. The computer-implemented method of claim 1, wherein:
    the third computing system transmitted the unique object identifier to the second computing system in connection with a third organization transferring a physical product that is assigned the unique identifier to a second organization;
    the second computing system transmitted the unique object identifier to the first computing system in connection with the second organization transferring the physical product to a first organization;
    the third computing system is administered by the third organization;
    the second computing system is administered by the second organization; and
    the first computing system is administered by the first organization.

8. A computer program product tangibly embodied in a computer-readable storage device and comprising instructions that when executed perform a method for discovering information that is related to a unique object identifier from a decentralized collection of computing systems that have stored information in association with the unique object identifier, the method comprising:
    identifying, in a computing device, a unique object identifier that a third computing system had previously transmitted to a second computing system, and that the second computing system had previously transmitted to a first computing system, wherein:
        (i) the first computing system stores first information in association with the unique object identifier, (ii) the second computing system stores second information in association with the unique object identifier, and (iii) the third computing system stores third information in association with the unique object identifier;

forwarding, from the computing device and to the first computing system, a first information request that includes the unique object identifier;

receiving, in the computing device and from the first computing system in response to the first information request, the first information that the first computing system has stored in association with the unique object identifier;

receiving, in the computing device and from the first computing system in response to the first information request, an identifier of the second computing system;

forwarding, from the computing device and to the second computing system as a result of having received the identifier of the second computing system from the first computing system, a second information request that includes the unique object identifier;

receiving, in the computing device and from the second computing system in response to the second information request, the second information that the second computing system has stored in association with the unique object identifier;

receiving, in the computing device and from the second computing system in response to the second information request, an identifier of the third computing system;

forwarding, from the computing device and to the third computing system as a result of having received the identifier of the third computing system from the second computing system, a third information request that includes the unique object identifier; and receiving, in the computing device and from the third computing system in response to the third information request, the third information that the third computing system has stored in association with the unique object identifier.

9. The program product of claim 8, wherein the method further comprises identifying, in the computing device, the unique object identifier based on the computing device performing an image detection operation of a physical symbol that has encoded the unique object identifier, wherein the physical symbol also encodes an identifier of the first computing system.

10. The program product of claim 8, wherein the computing device does not receive the unique object identifier from the first computing system before the computing device forwards the first information request to the first computing system.

11. The program product of claim 8, wherein the method further comprises:

receiving, in the computing device and from the first computing system in response to the first information request, an indication that the first computing system has stored the first information; and transmitting, by the computing device and to the first computing system in response to receiving the indication that the first computing system has stored the first information, a request that the first computing system transmit the first information to the computing device, wherein said receiving of the first information is performed in response to the request that the first computing system transmit the first information to the computing device.

12. The program product of claim 8, wherein the first information and the second information do not include (i) the unique object identifier, and (ii) identifiers for the first computing system and the second computing system.

13. A system comprising:

a programmable processor; and a computer-readable storage device coupled to the processor and having instructions stored therein, which when executed by the processor causes the processor to perform a method for discovering information that is related to a unique object identifier from a decentralized collection of computing systems that have stored information in association with the unique object identifier, the method comprising:

identifying, in a computing device, a unique object identifier that a third computing system had previously transmitted to a second computing system, and that the second computing system had previously transmitted to a first computing system, wherein:

(i) the first computing system stores first information in association with the unique object identifier, (ii) the second computing system stores second information in association with the unique object identifier, and (iii) the third computing system stores third information in association with the unique object identifier;

forwarding, from the computing device and to the first computing system, a first information request that includes the unique object identifier;

receiving, in the computing device and from the first computing system in response to the first information request, the first information that the first computing system has stored in association with the unique object identifier;

receiving, in the computing device and from the first computing system in response to the first information request, an identifier of the second computing system;

forwarding, from the computing device and to the second computing system as a result of having received the identifier of the second computing system from the first computing system, a second information request that includes the unique object identifier;

receiving, in the computing device and from the second computing system in response to the second information request, the second information that the second computing system has stored in association with the unique object identifier; receiving, in the computing device and from the second computing system in response to the second information request, an identifier of the third computing system;

forwarding, from the computing device and to the third computing system as a result of having received the identifier of the third computing system from the second computing system, a third information request that includes the unique object identifier; and receiving, in the computing device and from the third computing system in response to the third information request, the third information that the third computing system has stored in association with the unique object identifier.

14. The system of claim 13, wherein the method further comprises identifying, in the computing device, the unique object identifier based on the computing device performing an image detection operation of a physical symbol that has encoded the unique object identifier, wherein the physical symbol also encodes an identifier of the first computing system.

15. The system of claim 13, wherein the computing device does not receive the unique object identifier from the first computing system before the computing device forwards the first information request to the first computing system.

16. The system of claim 13, wherein the method further comprises:

receiving, in the computing device and from the first computing system in response to the first information request, an indication that the first computing system has stored the first information; and transmitting, by the computing device and to the first computing system in response to receiving the indication that the first computing system has stored the first information, a request that the first computing system transmit the first information to the computing device, wherein said receiving of the first information is performed in response to the request that the first computing system transmit the first information to the computing device.

17. The system of claim 13, wherein the first information and the second information do not include (i) the unique object identifier, and (ii) identifiers for the first computing system and the second computing system.

18. A computer-implemented method for discovering information that is related to a unique object identifier from a decentralized collection of computing systems that have stored information in association with the unique object identifier, the method comprising:

identifying, in a computing device, a unique object identifier that a third computing system had previously transmitted to a second computing system, and that the second computing system had previously transmitted to a first computing system, wherein:

(i) the first computing system stores first information in association with the unique object identifier, (ii) the second computing system stores second information in association with the unique object identifier, and (iii) the third computing system stores third information in association with the unique object identifier;

propagating a first information request from the computing device through the first computing system, the second computing system, and the third system such that the first information request is transmitted from the computing device to the first computing system, from the first computing system to the second computing system, and from the second computing system to the third computing system, wherein the first information request includes the unique object identifier and prompts the first, second, and third computing systems to send to the computing device information that each of the first, second, and third computing systems has stored in association with the unique object identifier, wherein the series of first, second, and third computing systems are computing systems that earlier communicated the unique object identifier through the first, second, and third computing systems in a direction that is opposite of a direction of the propagating first information request such that the third computing system earlier communicated the unique object identifier to the second computing system, and the second computing system earlier communicated the unique object identifier to the first computing system; and receiving, in the computing device and from each of the first, second, and third computing systems, the information that each of the additional computing systems has stored in association with the unique object identifier.

* * * * *